Feb. 15, 1927.
J. A. MILLIKEN
1,617,861
METHOD OF AND APPARATUS FOR SEVERING PLASTIC MATERIAL
Filed April 17, 1923
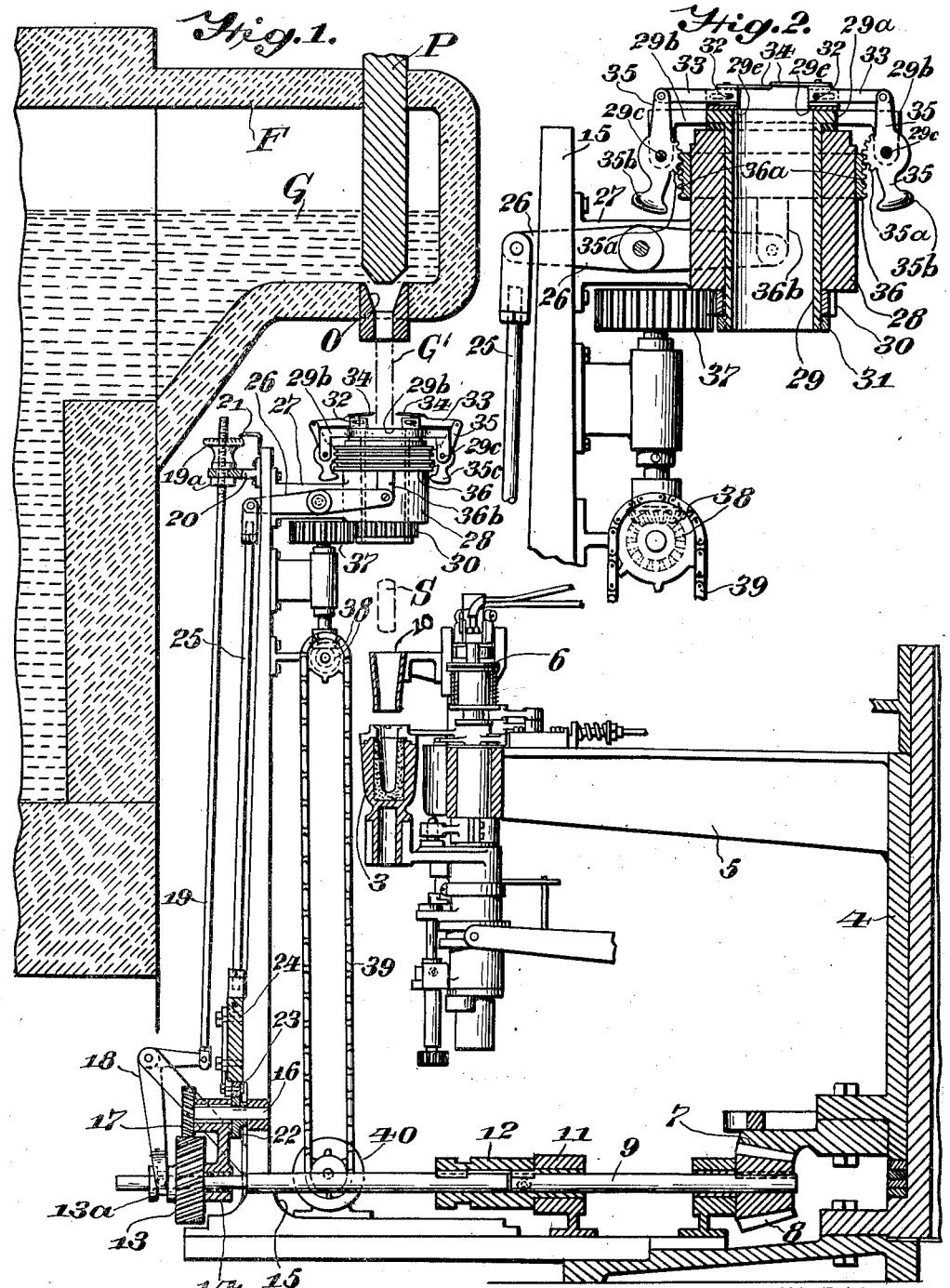

Patented Feb. 15, 1927.

1,617,861

UNITED STATES PATENT OFFICE.

JOHN A. MILLIKEN, OF AMBLER, PENNSYLVANIA, ASSIGNOR TO JOHN E. MARSDEN, OF PHILADELPHIA, PENNSYLVANIA.

METHOD OF AND APPARATUS FOR SEVERING PLASTIC MATERIAL.

Application filed April 17, 1923. Serial No. 632,748.

My invention relates to a method of and apparatus for dividing moving masses of plastic material into sections, and more particularly to means for and a method of dividing a stream of molten glass into slugs or gathers for molds.

One of the objects of my invention resides in the provision of an improved manner of effecting the separation of gathers or slugs from a body of molten glass, in timed relation to the movement of molds which are to be supplied with said gathers, and whereby such gathers are severed without forming of shreds or tailings.

Another object of my invention is to simplify and improve generally the construction and operation of devices of this character.

Still another object of my invention is to provide an improved means for effecting proper co-operation between a glass severing device and movable molds.

An illustration of one manner in which my invention may be employed is shown in the accompanying drawing wherein:—

Fig. 1 is a view, partially in section and partially in side elevation, of a severing device embodying my invention and the manner in which it is associated with a glass tank and a mold carrier.

Fig. 2 is a view, on an enlarged scale, of a portion of the apparatus of Fig. 1.

My invention constitutes in part a division of my application, Serial Number 600,516, filed November 13, 1922, and entitled Methods of and apparatus for blowing glass.

The severing device is shown as mounted beneath the orifice O of the forehearth F of a glass furnace within which a body of molten glass G is contained, a stream of molten glass G¹ being shown as flowing through the orifice. A plug P serves to control the rate of flow of glass through the orifice O.

In the form shown, the invention is designed to supply charges of molten glass to molds 3, a series of which are disposed concentrically of a rotatable column 4 and supported therefrom by arms 5 and provided with pressing and blowing mechanism 6, such as shown in my prior application above referred to. It will be understood that as the column is rotated, the molds 3 will be successively brought beneath the forehearth F of the glass furnace, to receive charges of molten glass. 10 is a funnel for directing a severed slug of glass S into the mold 3.

The column 4 is provided with an annular bevelled tooth portion or gear 7 that meshes with a bevel gear wheel 8. The gear wheel 8 is secured to a shaft 9 supported in a fixed bearing 11 and operating through a sleeve 12 to drive a shaft 9ª upon which a wide faced helical gear wheel 13 is slidably but non-rotatably supported. A bearing block 14 for the shaft 9ª is supported by the frame-work 15.

The helical gear wheel 13 meshes with a helical gear wheel 17 secured to a shaft 16 which is mounted in the frame 15 and the block 14. The gear wheel 13 is adjustable axially by lever 18 to serve as a timing gear to insure the cutting off of slugs or charges of glass in desired timed relation to the movement of the molds past the stream of glass; axial adjustment of gear 13 rotates gear 17 to advance or retard its time relation with respect to the mold carrier 4.

The gear wheel 13 is shifted by a pivoted bell crank 18 one end of which engages the hub portion 13ª of the wheel. The bell crank 18 is controlled by a rod 19 which is adjustable vertically by a hand wheel or nut 19ª that is rotatably supported by a bracket 20 and is provided with a scale that moves past a pointer 21 for indicating the degree of adjustment of the timing gears 13—17.

Secured to the shaft 16 is a cam 22 with which engages a roller 23 that is secured to a block 24. A rod 25 is secured to and extends upwardly from the block 24 and is connected at its upper end to a bar 26. The bar 26 is pivotally supported by a bracket 27 that is mounted upon the frame work 15.

A bearing block 28 is formed in the outer end of the bracket 27. A sleeve shaft 29 is rotatably supported within the bearing block 28, being held against downward movement therethrough by means of a flange 29ª that bears upon the upper end of the block 28.

The sleeve shaft 29 has an annular gear member 30 secured to the lower end thereof, such member being held in place by a screw collar 31. The sleeve shaft 29 is held against displacement upwardly with respect to the bearing block 28, by the gear 30.

The sleeve 29 is of such diameter as to permit passage therethrough of slugs of glass S that have been severed from the stream of glass G'. The flange 29ª of the sleeve 29, besides serving as a thrust bearing to prevent downward movement of the sleeve 29, is formed with brackets 29ᵇ that have depending ears in which pivot pins 29ᶜ are supported. The upper end of the sleeve 29 is also provided with two pairs of diametrically disposed bracket portions 29ᵉ through each pair of which extends a pin 32.

Each pair of bracket portions 29ᵉ is spaced apart to permit a slide bar 33 to be placed therebetween, each of the slide bars 33 being provided with a slot through which the pin 32 extends and therefore having movement radially of the sleeve 29.

Each bar 33 carries at its forward end a knife or edge plate 34 and at its rear end is pivotally connected to a rocker arm 35, such arms being supported on the pivot pins 29ᶜ and provided with gear teeth 35ª and with counter weights 35ᵇ the centrifugal forces of which counterbalance the centrifugal forces of the upper ends of said arms and the parts carried thereby, to avoid excessive strains by the moving parts. From the foregoing it will be understood that the rocker arms 35 and blade members 34 are rotatable with the sleeve shaft 29 about the longitudinal axis of such sleeve.

A collar 36 loosely surrounds the bearing block 28 and is provided with annular rack teeth 36ª upon its periphery and with two diametrically opposite depending ears 36ᵇ that are pivotally connected to the inner ends of the levers 26, so that as the levers 26 are oscillated by the cam 22, the collar 36 will be reciprocated vertically. The teeth 36ª of the collar 36 mesh with the teeth 35ª of the rocker arms 35, so that if the collar 36 is reciprocated vertically, the arms 35 will be oscillated about their pivots 29ᶜ and the blades 34 reciprocated in a substantially horizontal plane.

Rotation of the sleeve 29 is effected through the gear 30, gear wheel 37, bevel gear wheels 38 and a chain 39 which is driven by a motor 40.

With the motor 40 constantly operating, as is normally the case, and the rod 25 and lever 26 being oscillated through movement of the mold carrier 4, the sleeve 29 and the severing members 34 carried thereby, are rotated about the longitudinal axis of the sleeve, and the members 34 are moved inwardly as above explained. The simultaneous inward and rotative movements just referred to have the effect of moving the blade members 34 through spirals which terminate adjacent of the longitudinal axis of the sleeve. The severing action thus obtained is not a shearing action, within the generally accepted meaning of the word "shear", but more nearly resembles what might be called a spinning cutting action. The effect secured is similar to that of the hand process wherein the operator severs the charge of glass from a punty or gathering rod by rolling the molten glass along the edge of a severing member. In the present case this action results in a smooth end both on the rear end of the severed slug S and at the forward end of the advancing stream of glass G'.

In practice, I prefer to withdraw the severing members 34 from contact with the glass G' as quickly as possible, in order to prevent undue retardation of the flow of glass and consequent piling of such glass upon the upper sides of the members 34. It has been found that, with the stream of glass moving at a speed of say three inches in three seconds, satisfactory results can be secured by so constructing the cam 22 that the reciprocation of the collar 36, from the position shown in Fig. 1 to the position shown in Fig. 2 and back again to its position in Fig. 1, will require but substantially one-half second, the members 34 being held in inoperative relation to the stream of glass during the remaining two and one-half seconds of the period required for a three-inch slug of glass to pass.

Assuming the rotation of the mold carrier 4 to be at such speed that a mold 3 will be brought into position to receive a slug of glass each three seconds, the cam member 22 must also be revolved once each three seconds, so that the cutting-off members 34 may be moved through a complete cycle each three seconds.

The foregoing periods of time are given merely as illustrative, and may of course be varied to suit different requirements and conditions.

From the foregoing, it will be seen that I provide means for accurately and smoothly severing measured quantities from a stream of glass without interrupting the flow thereof, and without the necessity of providing complicated mechanism for moving the severing devices with the stream of glass while the cutting-off action is taking place. Various changes in detail and general arrangement may be made without departing from the spirit and scope of the invention as defined in the accompanying claims. Furthermore, the invention is not limited in its scope to cutting streams of molten glass, but may be employed to divide materials other than glass.

What I claim is:

1. The method of severing charges of glass comprising maintaining a flow of molten glass from a container and causing severing devices to rotate in an orbit in one direction around and relative to the stream of glass and moving said severing device back and forth across the longitudinal axis of said stream during said rotation.

2. The method of severing charges of glass which comprise effecting a flow of molten glass under the action of gravity, rotating a severing device through a plurality of revolutions in one direction with respect to the stream of glass, and also moving it toward and from the longitudinal axis of said stream of glass.

3. The method of severing charges of molten glass from a flowing stream thereof comprising rotating a severing device in a given direction in a spiral path relative to said glass stream and toward the axis thereof, and withdrawing it while continuing the rotation in the same direction.

4. The method of severing measured quantities from a continuously moving stream of plastic material comprising moving a cutting device transversely across the stream within a period of time less than that required for a predetermined quantity of such material to pass said cutting device and then retracting the cutting device and so timing the movements of the cutting device that the period of retraction plus the period required for the severing movement equals the time required for said predetermined quantity to pass, the said cutting device being continuously rotated in an orbit in one direction around and relative to said stream, the transverse movements of the cutting device taking place during said continuous rotation.

5. A severing device for dividing a stream of molten glass into longitudinal sections comprising a rotatably supported carrier sleeve having a passage for the stream of glass, means for continuously rotating said carrier sleeve relative to said stream and in one direction, cutting means mounted on said carrier sleeve so as to normally travel in an orbit around said stream, and means for intermittently causing the cutting means to operate transversely across said stream during said orbital travel.

6. A severing device for dividing a stream of molten glass into longitudinal sections comprising a rotatably supported carrier sleeve having a passage for the stream of glass, means for continuously rotating said carrier sleeve relative to said stream and in one direction, a pair of cutting members mounted on said carrier sleeve so as to travel in an orbit around said stream, and means for intermittently reciprocating said cutting members transversely across said passage during said orbital travel.

7. A severing device for dividing a stream of molten glass into longitudinal sections comprising a cutting device, means for causing said cutting device to continuously travel in an orbit around and relative to said stream in one direction, and means for intermittently causing said cutting device to operate transversely across said stream during its travel around the same.

8. A severing device for dividing a stream of molten glass into longitudinal sections comprising two oppositely disposed cutters, means for causing said cutters to continuously travel in an orbit and relative to said stream in one direction, means for maintaining said cutters in normally separated relation, and intermittently operable means for reciprocating said cutters at high speed and transversely of said stream during said travel.

9. The combination with a plurality of receptacles and mechanism for positioning the same, of cutting means, means for causing said cutting means to continuously travel in an orbit in one direction about and relative to a stream of plastic material, and means operated by said positioning mechanism for operating the cutting means during said travel to move it transversely across said stream.

10. The combination with a plurality of receptacles and mechanism for positioning the same, of cutting means, means for causing said cutting means to continuously travel in an orbit in one direction about and relative to a stream of plastic material, means for operating the cutting means during said travel to move it transversely across said stream, an operating connection between said positioning mechanism and said cutter operating means, and means whereby said operating connection may be adjusted to obtain a desired time relation between the actuation of the cutting means and the positioning of the receptacles.

11. A severing device for dividing a stream of molten glass into longitudinal sections comprising a rotatably supported carrier having a passage for the stream of glass, means for continuously rotating said carrier in one direction relative to said stream, blade members mounted on the carrier so as to reciprocate transversely of said passage and to travel in an orbit around said stream, actuating levers for said blade members also mounted on said sleeve, and means unaffected by rotation of said sleeve for imparting movements to said levers.

12. A severing device for dividing a stream of molten glass into longitudinal sections comprising a rotatably supported carrier having a passage for the stream of glass, means for continuously rotating said carrier relative to said stream and in one direction, blade members mounted on the carrier so as to reciprocate transversely of said passage and to travel in an orbit around said stream, a slidably supported gear ring surrounding said carrier, said gear ring being unaffected by rotation of said carrier, actuating levers for said plate members also mounted on said carrier, said levers having portions engaging said gear ring, and means for reciprocating said gear ring.

13. Severing apparatus comprising a rotatable sleeve provided on its periphery with gear teeth, a driven gear wheel meshing with said teeth, an oscillating arm pivotally supported by said sleeve, a blade supported by said arm and disposed radially of said sleeve, gear teeth on said arm, a rack member movable axially of said sleeve and whose teeth mesh with the teeth of said arm and means for moving said rack member axially of said sleeve.

14. The combination with a plurality of receptacles and means for moving the same past a given point, of a device actuated by said means for severing masses from a stream of material for delivery to said receptacles and comprising a cam actuated by said means, and a reciprocable blade member positively actuated by said cam transversely to the stream of said material.

15. Severing apparatus comprising a rotatable member, rotatable blade members movable transversely of said member, pivotally supported actuating arms for said blade members, means for oscillating said arms about their pivots to reciprocate said blade members across the path of material to be cut, and means opposing the centrifugal forces acting on said blade members.

16. Severing apparatus comprising a supporting member, a vertically disposed bearing block supported thereby, a sleeve supported within said block, means for rotating said sleeve, a blade member carried by said sleeve, a toothed member for imparting reciprocating movement to said blade, a collar loosely surrounding said sleeve, teeth carried by said collar in position to mesh with said first named teeth, and means for reciprocating said collar axially of said sleeve.

17. Severing apparatus comprising a rotatable sleeve, a pair of oscillatory arms pivotally supported by said sleeve, a blade supported by each of said arms and disposed radially of said sleeve, teeth on oppositely disposed surfaces of said arms. a rack member engaging said teeth, and means for simultaneously rotating said sleeve and actuating said rack member to move the said blades toward one another.

18. Apparatus for severing masses from a stream of plastic material, comprising a rotatable severing member, and a weight rotatable with said severing member and so disposed with respect thereto as to oppose the centrifugal force acting upon said severing member.

In testimony whereof I have hereunto affixed my signature this 9th day of April, 1923.

JOHN A. MILLIKEN.